(12) United States Patent
Kokubu et al.

(10) Patent No.: US 7,187,095 B2
(45) Date of Patent: Mar. 6, 2007

(54) MOTOR, CONTROL CIRCUIT MEMBER AND MANUFACTURING METHOD OF MOTOR

(75) Inventors: Hiroshi Kokubu, Kosai (JP); Tatsuya Suzuki, Kosai (JP); Katsuhiko Torii, Kosai (JP); Kazutaka Sakohira, Kosai (JP)

(73) Assignee: ASMO Co., Ltd., Shizuoka-pref (JP)

( * ) Notice: Subject to any disclaimer, the term of this patent is extended or adjusted under 35 U.S.C. 154(b) by 29 days.

(21) Appl. No.: 11/061,447

(22) Filed: Feb. 22, 2005

(65) Prior Publication Data

US 2005/0184606 A1 Aug. 25, 2005

(30) Foreign Application Priority Data

Feb. 24, 2004 (JP) ............................. 2004-048321
Jun. 30, 2004 (JP) ............................. 2004-193831

(51) Int. Cl.
*H02K 5/22* (2006.01)
*H02K 11/00* (2006.01)
*H02K 7/10* (2006.01)
*H02K 23/00* (2006.01)

(52) U.S. Cl. .................. 310/75 R; 310/68 R; 310/71; 310/89; 310/68 B; 310/83

(58) Field of Classification Search ............... None
See application file for complete search history.

(56) References Cited

U.S. PATENT DOCUMENTS

| 4,459,518 | A | * | 7/1984 | Chevallier ............. 318/286 |
| 5,245,258 | A | | 9/1993 | Becker et al. |
| 5,382,857 | A | | 1/1995 | Schellhorn et al. |
| 5,434,748 | A | * | 7/1995 | Fukui et al. ............. 361/757 |
| 6,191,512 | B1 | | 2/2001 | Lekeux et al. |
| 6,201,326 | B1 | * | 3/2001 | Klappenbach et al. .... 310/75 R |
| 6,431,026 | B1 | * | 8/2002 | Walther et al. ........... 74/606 R |
| 6,528,915 | B1 | * | 3/2003 | Moskob ..................... 310/71 |
| 6,756,711 | B2 | | 6/2004 | Matsuyama et al. |
| 6,759,783 | B2 | | 7/2004 | Hager et al. |
| 6,903,473 | B2 | * | 6/2005 | Matsuyama et al. ......... 310/71 |
| 2002/0079758 | A1 | * | 6/2002 | Matsuyama et al. ....... 310/68 R |
| 2003/0127921 | A1 | | 7/2003 | Akutsu et al. |
| 2003/0137202 | A1 | | 7/2003 | Mao et al. |
| 2004/0012279 | A1 | * | 1/2004 | Ursel et al. ............. 310/75 R |
| 2004/0027013 | A1 | | 2/2004 | Aab et al. |
| 2004/0061391 | A1 | * | 4/2004 | Matsuyama et al. ......... 310/71 |
| 2004/0178687 | A1 | | 9/2004 | Mirescu |

FOREIGN PATENT DOCUMENTS

| DE | 101 41 244 A1 | 3/2003 |
| JP | A-7-154947 | 6/1995 |

* cited by examiner

*Primary Examiner*—Burton Mullins
(74) *Attorney, Agent, or Firm*—Posz Law Group, PLC

(57) ABSTRACT

A brush holder is installed to a motor main body and has a connector arrangement, which is directly connectable with an external connector to receive electric power. The brush holder holds a plurality of power supply brushes. A control circuit member is installed in a gear housing through an installation opening of the gear housing. The control circuit member controls rotation of the motor main body and is electrically connected to the connector arrangement and the power supply brushes.

19 Claims, 10 Drawing Sheets

MOTOR, CONTROL CIRCUIT MEMBER AND MANUFACTURING METHOD OF MOTOR

CROSS REFERENCE TO RELATED APPLICATION

This application is based on and incorporates herein by reference Japanese Patent Application No. 2004-48321 filed on Feb. 24, 2004, Japanese Patent Application No. 2004-193831 filed on Jun. 30, 2004 and Japanese Patent Application No. 2004-326385 filed on Nov. 10, 2004.

BACKGROUND OF THE INVENTION

1. Field of the Invention

The present invention relates to a motor, a control circuit member of the motor and a manufacturing method of the motor.

2. Description of Related Art

A motor of, for example, a power window system includes a motor main body, a speed reducing unit and a control circuit member. The motor main body generates a rotational force. The speed reducing unit includes a speed reducing mechanism, which is received in a gear housing and decelerates a rotational speed of the motor main body. The control circuit member includes electrical circuit components (e.g., an IC), which control the rotation of the motor main body.

In the case of one such motor, the motor main body and the speed reducing unit are assembled together to form an intermediate assembly of the motor main body and the speed reducing unit, and the control circuit member is installed into the gear housing through a receiving hole, which is formed in the gear housing (See U.S. Pat. No. 5,245,258). Various types of control circuit members, each of which has a different set of electrical circuit components, can be installed to the intermediate assembly (without the control circuit member) of the motor main body and the speed reducing unit. More specifically, the intermediate assembly (without the control circuit member) of the motor main body and the speed reducing unit is made as a universal component (a versatile component), and various types of motors (each having the different set of the electrical circuit components) can be made with such a universal component by simply changing the control circuit member. As a result, the manufacturing costs can be reduced.

However, in the above motor, the connector arrangement is provided in the control circuit member. The external connector is fitted to the connector arrangement of the control circuit member, and the electrical circuit components of the control circuit member are electrically connected to a power source through the connector arrangement and the external connector. When the connector arrangement is provided to the control circuit member, the position of the connector arrangement is limited by the securing position of the control circuit member. The securing position of the control circuit member is, in turn, limited by various factors due to the fact that the control circuit member needs to be installed into the gear housing. Thus, in some cases, the connector arrangement cannot be placed to a desired position. For instance, a normal motor (i.e., a motor without the control circuit member) is often used as a drive source of the power window system and is secured to a securing member of a vehicle door. In one type of normal motor, the connector arrangement is provided on a lateral side of a connection between a yoke housing of the motor main body and the gear housing at a location adjacent to a brush holder. When this type of normal motor needs to be replaced with the above type of motor having the control circuit member with the connector arrangement, the above type of motor cannot be simply installed to the preexisting securing member of the vehicle door. That is, the securing member also needs to be replaced with a corresponding one. Furthermore, the securing position of the control circuit member (the securing structure, such as the receiving hole) is limited by the position of the connector arrangement. Thus, in some cases, the control circuit member cannot be placed to the desired position (e.g., a dead space in the gear housing).

SUMMARY OF THE INVENTION

The present invention addresses the above disadvantages. Thus, it is an objective of the present invention to provide a motor, which includes a control circuit member and provides more freedom with respect to a position of a connector arrangement. It is another objective of the present invention to provide a control circuit member of such a motor. It is another objective of the present invention to provide a manufacturing method of such a motor.

To achieve the objectives of the present invention, there is provided a motor having a motor main body and a speed reducing unit. The motor main body includes a brush holder. The brush holder has a connector arrangement that is directly connectable with an external connector to receive electric power. The brush holder holds a plurality of power supply brushes. The speed reducing unit includes a gear housing, a speed reducing mechanism and a control circuit member. The gear housing is connected to the motor main body and includes a circuit member installation opening. The installation opening opens in a direction away from the brush holder. The speed reducing mechanism is received in the gear housing and decelerates rotation of the motor main body. The control circuit member is installed in the gear housing through the installation opening of the gear housing. The control circuit member controls the rotation of the motor main body and is electrically connected to the connector arrangement and the power supply brushes.

To achieve the objectives of the present invention, there is also provided a control circuit member for a motor, which includes a motor main body and a speed reducing unit. The motor main body includes a connector arrangement and a plurality of power supply brushes, and the connector arrangement is connectable with an external connector to receive electric power. The control circuit member includes an elongated base, a plurality of connection terminals and a plurality of electrical circuit components. The connection terminals are secured to the base. At least one of the plurality of connection terminals is electrically connectable to the connector arrangement, and at least another one of the plurality of connection terminals is electrically connectable to at least one of the plurality of power supply brushes. The electrical circuit components are secured to the base and control rotation of the motor main body. The plurality of electrical circuit components includes a rotation sensor that senses the rotation of the motor main body. The rotation sensor is displaced away from the rest of the plurality of electrical circuit components in a direction perpendicular to a plane of the base.

To achieve the objectives of the present invention, there is also provided a method for manufacturing a motor. According to the method, a brush holder is installed to a motor main body. The brush holder has a connector arrangement that is directly connectable with an external connector to receive electric power, and the brush holder holds a plurality of power supply brushes. The motor main body and a speed reducing unit are assembled together. A control circuit member is installed into a gear housing of the speed reducing unit through a circuit member installation opening of the gear housing, which opens in a direction away from the brush holder. Each of a plurality of connection terminals of the control circuit member is connected to a corresponding one of the power supply brushes and the connector arrangement.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
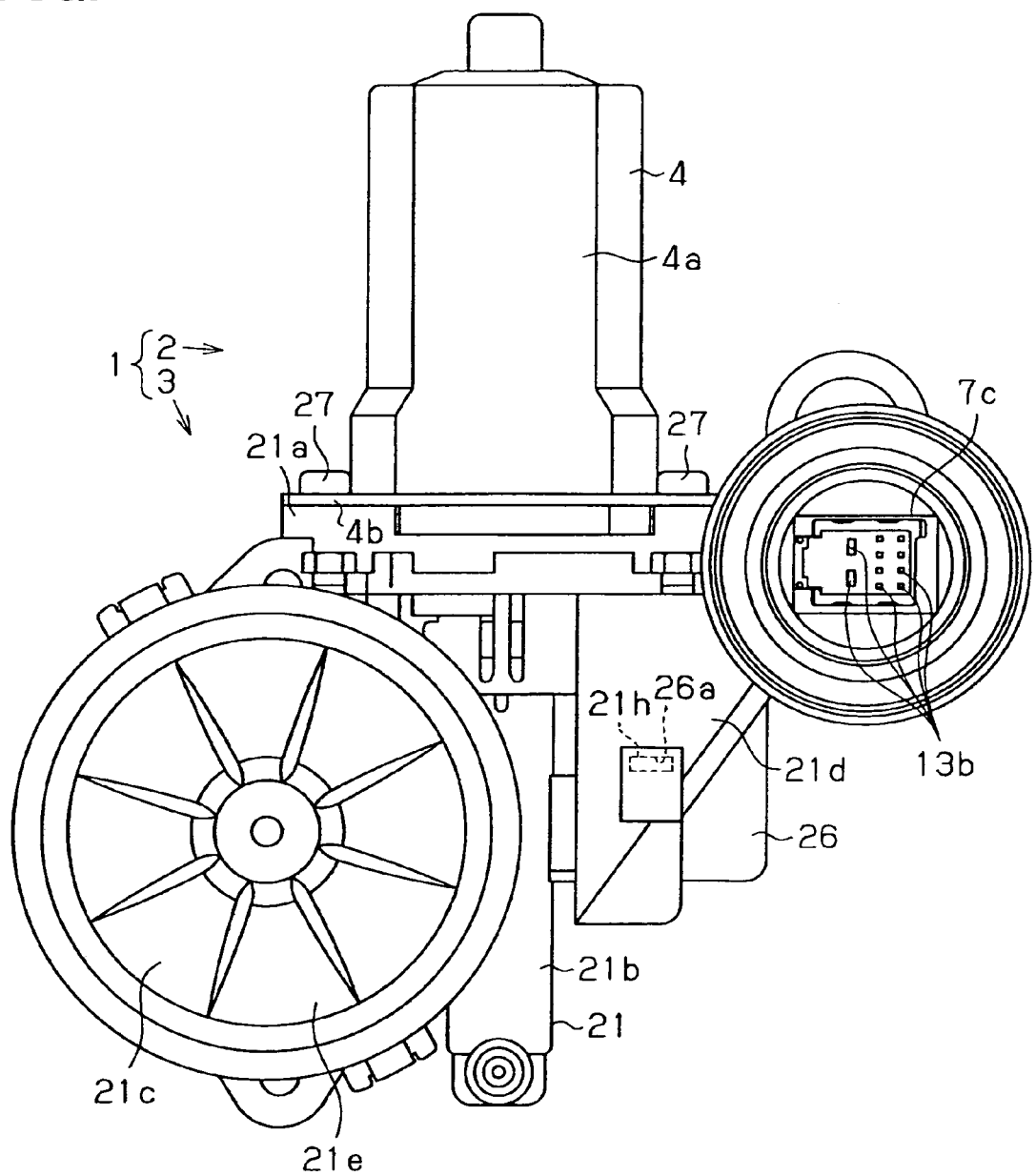
FIG. 1 is a plan view of a motor according to an embodiment of the present invention.

A motor 1 of a vehicle power window system according to an embodiment of the present invention will be described with reference to FIGS. 1 to 3. Referring to FIG. 1, the motor 1 has a motor main body 2 and a speed reducing unit 3. The speed reducing unit 3 decelerates the rotation of the motor main body 2.

Figure 2:
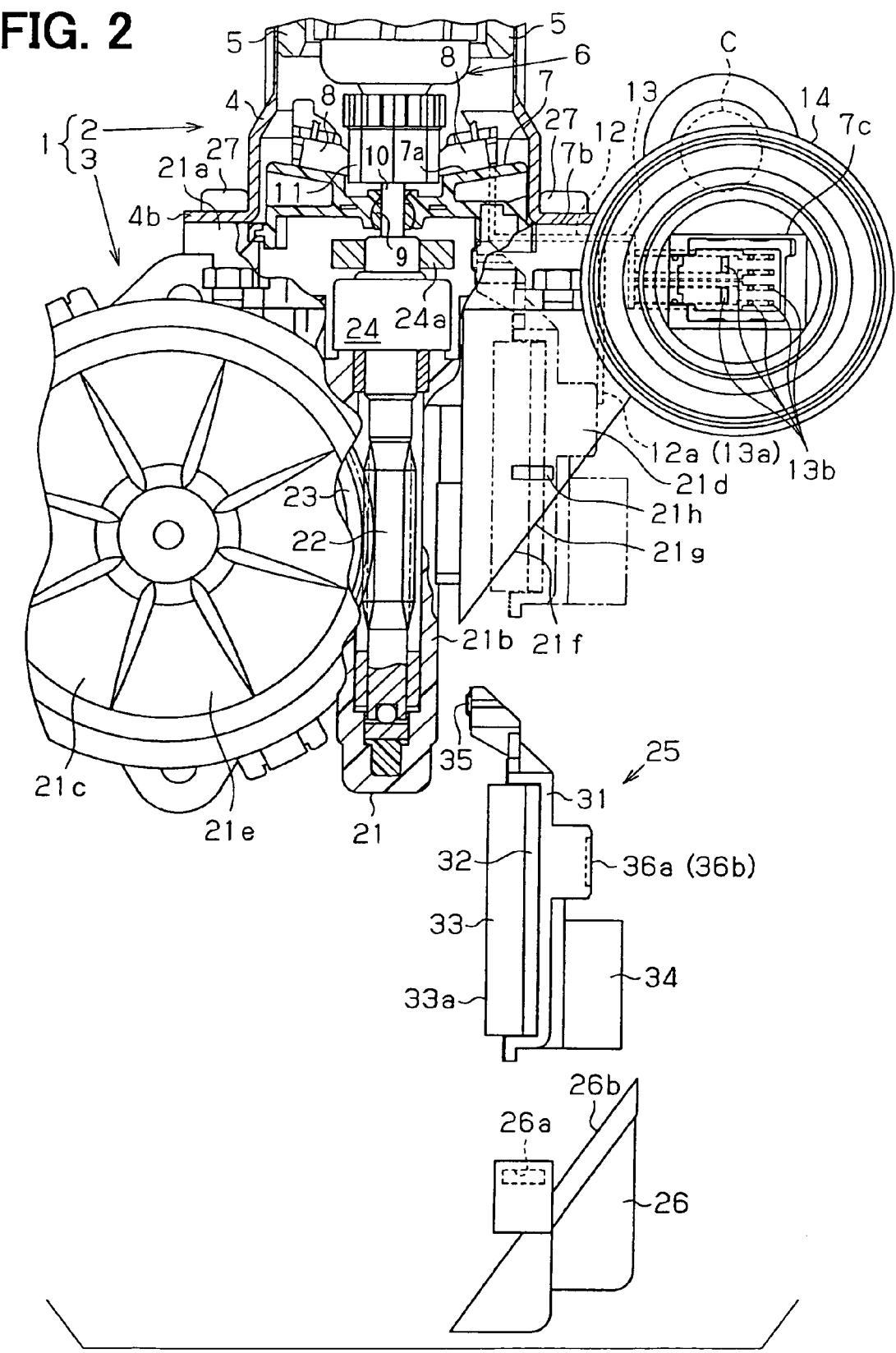
FIG. 2 is a partially fragmented and exploded view showing a portion of the motor shown in FIG. 1.

Referring to FIGS. 1 and 2, the motor main body 2 has a yoke housing (hereinafter, referred to as "yoke") 4, two magnets 5 (FIG. 2), an armature 6, a brush holder 7 and two power supply brushes 8. The yoke 4 is formed into a cup shaped body, which is diametrically compressed. The magnets 5 are attached to the inner peripheral surface of the yoke 4. The armature 6 is rotatably supported in the yoke 4.

The brush holder 7 is formed of a resin material. Furthermore, the brush holder 7 has a holder main body 7a, a protruding portion 7b and a connector arrangement 7c, which are formed integrally. The holder main body 7a is formed to be substantially received in an opening of the yoke 4. A bearing 9 is secured in a central hole of the holder main body 7a. A distal end of a rotatable shaft 10 of the armature 6 is rotatably supported by the bearing 9. The brushes 8 are slidably held by corresponding portions of the holder main body 7a, which are located inside the yoke 4. The brushes 8 are urged against a commutator 11 of the armature 6, which is secured to the rotatable shaft 10. The protruding portion 7b is made in a form of a flange, which extends radially outward from the holder main body 7a.

The connector arrangement 7c is provided to a distal end of the protruding portion 7b. More specifically, the connector arrangement 7c is formed in one end of the protruding portion 7b, which extends in s direction parallel to a flat surface 4a (a surface that is parallel to the plane of FIG. 1 or 2) of the yoke 4. An external connector (not shown) is connectable to the connector arrangement 7c in a direction perpendicular to the flat surface 4a (i.e., the direction, which is perpendicular to the plane of FIG. 1 or 2 and which extends into the plane of FIG. 1 or 2 from the front side of the plane in FIG. 1 or 2).

Figure 3C:
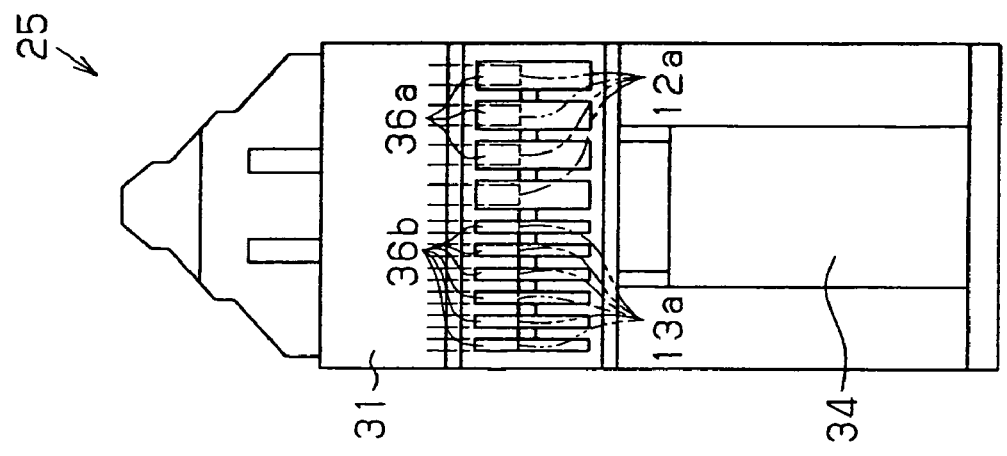
FIG. 3C is a plan view of the control circuit member seen from the other side of the control circuit member.
Figure 3B:
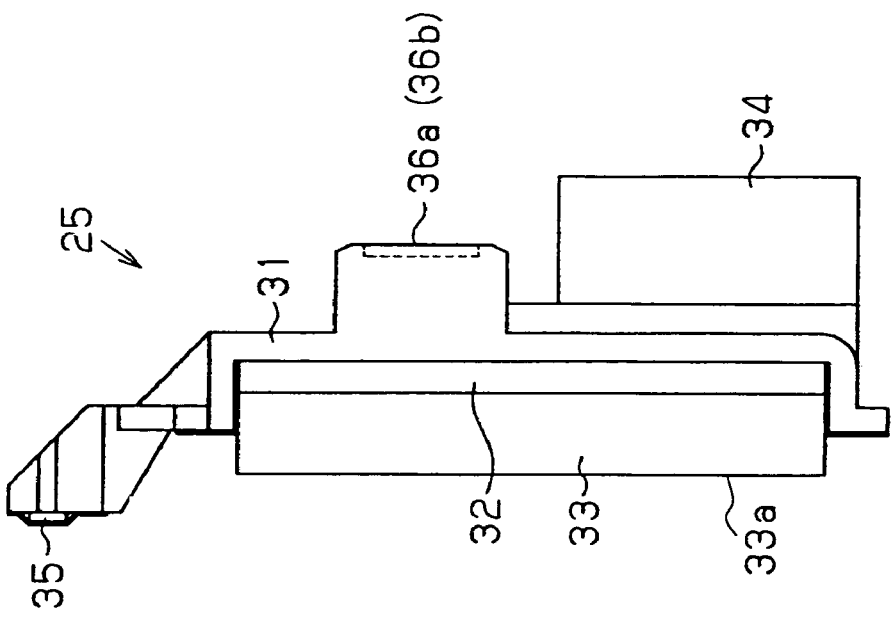
FIG. 3B is a side view of the control circuit member.
Figure 3A:
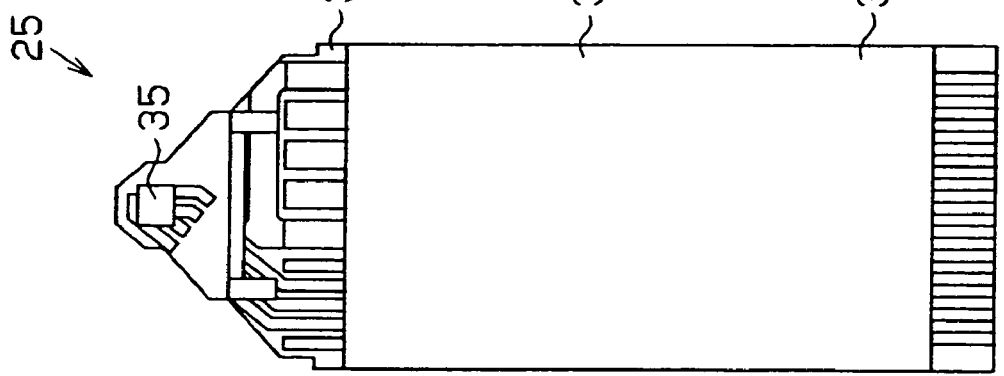
FIG. 3A is a plan view of a control circuit member of the motor seen from one side of the control circuit member.

Brush side electrical conductors 12 and connector side electrical conductors 13 are insert molded into the brush holder 7. The brush side electrical conductors 12 extend from corresponding portions of the holder main body 7a, which are located inside the yoke 4, to the protruding portion 7b. The distal ends of the brush side electrical conductors 12 form internal connection terminals 12a. The internal connection terminals 12a project from, i.e., are exposed from the protruding portion 7b in the axial direction of the motor main body 2 (the downward direction in FIG. 2). The brushes 8 are electrically connected to the base ends of the brush side electrical conductors 12 by pigtails, respectively. The connector side electrical conductors 13 extend from the connector arrangement 7c to the protruding portion 7b. The distal ends of the connector side electrical conductors 13 form internal connection terminals 13a. The internal connection terminals 13a project from, i.e., are exposed from the protruding portion 7b in the axial direction of the motor main body 2 (the downward direction in FIG. 2). The base ends of the connector side electrical conductors 13 are exposed at the connector arrangement 7c and form external connection terminals 13b. When the external connector is connected to the connector arrangement 7c, the external connection terminals 13b are electrically connected to corresponding terminals of the external connector. A choke coil C, which is received in the connector arrangement 7c, is interposed between the internal connection terminals 13a and the external connection terminals 13b of the connector side electrical conductors 13 of the present embodiment. The internal connection terminals 12a, 13a are arranged parallel to one another in the direction (the direction perpendicular to the plane of FIG. 2) perpendicular to the flat surface 4a (or a plane of a worm wheel 23 described below), as shown in FIG. 3C. Since the internal connection terminals 12a, 13a are arranged parallel to one another in the direction perpendicular to the plane of FIG. 2, only one of the internal connection terminals 12a, 13a is shown in FIG. 2. In the brush holder 7, the outer peripheral surface of the holder main body 7a, the protruding portion 7b and the connector arrangement (the portion that corresponds to the choke coil C) 7c are covered with a waterproof member 14, which is made of elastomer, except the portion of the connector arrangement 7c where the external connection terminals 13b are provided.

The speed reducing unit 3 has a gear housing 21, a worm shaft 22, the worm wheel 23, a clutch 24, a control circuit member 25 and a cover 26. In the present embodiment, the worm shaft 22 and the worm wheel 23 constitute a speed reducing mechanism.

The gear housing 21 is made of a resin material. The gear housing 21 has a fixing portion 21a, a worm receiving portion 21b, a wheel receiving portion 21c and a circuit receiving portion 21d.

The fixing portion 21a has a shape, which corresponds to a flange 4b that is formed around the opening of the yoke 4. The fixing portion 21a is fixed to the flange 4b by screws 27. The protruding portion 7b of the brush holder 7 is clamped between the fixing portion 21a and the flange 4b via the waterproof member 14.

The worm receiving portion 21b is formed into a cylindrical body, which extends along an imaginary extension line of the rotatable shaft 10. The worm receiving portion 21b rotatably supports the worm shaft 22 therein. The clutch 24 is provided to the motor main body 2 side in the interior of the worm receiving portion 21b. The clutch 24 couples between the worm shaft 22 and the rotatable shaft 10 to transmit a driving force. The clutch 24 transmits the driving force of the rotatable shaft 10 to the worm shaft 22. However, the clutch 24 is operated to lock the worm shaft 22 and thereby to limit transmission of the drive force from the worm shaft 22 to the rotatable shaft 10. Thus, the clutch 24 is provided to limit the rotation of the motor 1, which is caused by the force transmitted from the load side (e.g., the window glass) of the power window system. Furthermore, a sensor magnet 24a is provided to the clutch 24 to rotate integrally with the rotatable shaft 10.

The wheel receiving portion 21c is formed into a flat disk shape, which has a plane that extends in a direction perpendicular to the worm receiving portion 21b. Furthermore, the worm wheel receiving portion 21c rotatably supports the worm wheel 23 therein. The interior of the worm receiving portion 21b and the interior of the wheel receiving portion 21c are communicated to each other at a connection therebetween. The worm shaft 22 and the worm wheel 23 are meshed with each other in that connection. The wheel receiving portion 21c is formed on the opposite side (i.e., the left side in FIG. 1 or 2) of the worm receiving portion 21b, which is opposite to the connector arrangement 7c. A flat surface 21e of the wheel receiving portion 21c is parallel to the plane of the worm wheel 23, which is perpendicular to a rotational axis of the worm wheel 23. Furthermore, the flat surface 21e of the wheel receiving portion 21c is also parallel to the flat surface 4a of the yoke 4, as shown in FIG. 1. When the gear housing 21 is viewed as a whole, a plane, which extends parallel to the flat surface 21e (the plane of the worm wheel 23), serves as a flat surface or a plane of the gear housing 21.

The circuit receiving portion 21d is positioned to correspond to the internal connection terminals 12a, 13a. The internal connection terminals 12a, 13a are disposed inside the circuit receiving portion 21d. More specifically, the circuit receiving portion 21d is placed on the opposite side of the worm receiving portion 21d, which is opposite to the wheel receiving portion 21b. Furthermore, the circuit receiving portion 21d is located between the worm receiving portion 21b and the connector arrangement 7c. The interior of the circuit receiving portion 21d is communicated with a portion (specifically, a portion that corresponds to the sensor magnet 24a) of the interior of the worm receiving portion 21b, which is located on the motor main body 2 side of the worm receiving portion 21b. The circuit receiving portion 21d has a receiving hole (or a receiving space) 21f, into which the control circuit member 25 is insertable in a direction (an installing direction) parallel to the axial direction of the rotatable shaft 10 to place the control circuit member 25 in the circuit receiving portion 21d. The receiving hole 21f has a circuit member installation opening 21g. In the gear housing 21, the opening 21g opens in a direction away from the brush holder 7. In this particular example, an outer edge of the opening 21g extends linearly. A direction (hereinafter, simply referred to as an opening direction of the opening 21g), which is perpendicular to the linear outer edge of the opening 21g, is slanted, i.e., is angled relative to the axial direction of the rotatable shaft 10 (i.e., of the motor main body 2) and is also relative to the direction perpendicular to the axial direction of the rotatable shaft 10. In this embodiment, when viewed in the direction perpendicular to the flat surface or plane of the gear housing 21, the opening 21g extends linearly and smoothly without forming a step along an imaginary straight line that connects between the connector arrangement 7c and the distal end of the worm receiving portion 21b (the end opposite to the motor main body 2). The internal connection terminal 12a of each brush side electrical conductor 12 and the internal connection terminal 13a of each connector side electrical conductor 13 are positioned to be visible through the opening 21g when viewed from the outside of the opening 21g in the opening direction of the opening 21g. An engaging claw 21h (FIG. 2) is formed in the outer flat surface of the circuit receiving portion 21d. The control circuit member 25 is substantially received in the circuit receiving portion 21d.

As shown in FIGS. 2 and 3A to 3C, the control circuit member 25 includes a base 31, a heat sink 32, a molded IC 33, a capacitor 34, a Hall element (a rotation sensor) 35 and a plurality of connection terminals 36a, 36b (FIG. 3C). In the present embodiment, the molded IC 33, the capacitor 34 and the Hall element 35 are formed as electrical circuit components. The base 31 is made of a resin material and is formed into a plate shape. The molded IC 33 of a generally plate shape is secured to one side surface (the left side surface in FIG. 2 or 3B) of the base 31 through the heat sink 32 of a plate shape. The capacitor 34 of a generally a cylindrical shape is secured to the other side surface (the right side surface in FIG. 2 or FIG. 3B) of the base 31. In the present embodiment, the heat sink 32 and the molded IC 33 are joined together by adhesive, bond or any other joining material. The Hall element 35 (FIG. 3A) is secured to a portion of the one side surface (the left side surface in FIG. 2 or 3B) of the base 31, which is positioned to correspond with the sensor magnet 24a. The connection terminals 36a, 36b (FIG. 3C), which are electrically connected to the molded IC 33 or the like, are partially insert molded in a portion of the other side surface (the right surface in FIG. 2 or 3B) of the base 31, which corresponds to the internal connection terminals 12a of the brush side electrical conductors 12 and the internal connection terminals 13a of the connector side electrical conductors 13. In the present embodiment, the control circuit member 25 does not have a relay, which serves as a drive circuit part. Instead, the molded IC 33 internally includes a power MOSFET, which serves as the drive circuit part. The molded IC 33 forms a control circuit for controlling a pinching limiting operation. In the pinching limiting operation, when it is determined that an object is pinched by the window glass of the vehicle power window system based on, for example, a rotational speed of the sensor magnet 24a (the rotatable shaft 10), which is measured through the Hall element 35, the control circuit supplies reverse electric current to the brushes 8 (the motor main body 2) to rotate the motor main body 2 in the reverse direction and thereby to lower the window glass for releasing the pinched object from the window glass. In the present embodiment, each connection terminal 36a has a relatively large width, which corresponds to the internal connection terminal 12a of the corresponding brush side electrical conductor 12. Furthermore, each connection terminal 36b has a relatively small width, which corresponds to the internal connection terminal 13a of the corresponding connector side electrical conductor 13.

In a control circuit member installation step, the control circuit member 25 is installed into the gear housing 21 (the circuit receiving portion 21d) in the installing direction through the receiving hole 21f in the assembled state where the motor main body 2 and the speed reducing unit 3 are assembled together. At this time, the control circuit member 25 is press fitted into the gear housing 21. More specifically, at the time of installation of the control circuit member 25, lateral edges of the base 31 (the left and right lateral edges of the base 31 in FIG. 3C) of the control circuit member 25 tightly and slidably contact opposed inner lateral walls of the receiving hole 21f, which are spaced from one another in the direction perpendicular to the plane of FIG. 2. In this way, the position of the control circuit member 25 in the receiving hole 21f is stabilized after the installation of the control circuit member 25. Also, as shown in FIG. 3C, each of the connection terminals 36a, 36b is positioned to be electrically connectable to, i.e., is engaged with the corresponding one of the internal connection terminals 12 of the brush side electrical conductors 12 (the brushes 8) and the internal connection terminals 13a of the connector side electrical conductors 13 (the connector arrangement 7c). In this state, similar to the internal connection terminals 12a, 13a, each of the connection terminals 36a, 36b is positioned to be visible through the opening 21g when viewed from the outside of the opening 21g in the opening direction. Furthermore, in this state, similar to the internal connection terminals 12a, 13a, the connection terminals 36a, 36b are arranged parallel to one another in the direction perpendicular to the flat surface (the flat surfaces 4a, 21e or the plane of the worm wheel 23) of the gear housing 21 (the direction perpendicular to the plane of FIG. 2). In the present embodiment, in a connecting step, each of the connection terminals 36a, 36b, which are visible through the opening 21g when viewed from the outside of the opening 21g in the opening direction, is laser welded to the corresponding one of the internal terminals 12a, 13a to form an electrical connection therebetween. Here, it should be noted that the width of the internal connection terminal 12a of each brush side electrical conductor 12 is made smaller than the width of the corresponding connection terminal 36a, as shown in FIG. 3C, to facilitate the laser welding for connecting therebetween. Furthermore, in this state, the molded IC 33 is positioned such that a flat surface 33a of the molded IC 33 extends in the direction perpendicular to the flat surface (the flat surfaces 4a, 21e) of the gear housing 21 (the direction perpendicular to the plane of FIG. 2). Also, in the present embodiment, in this state, a portion of the control circuit member 25 (a portion of the capacitor 34) is disposed outside of the circuit receiving portion 21d (the opening 21g).

A cover 26, which is made of a resin material, is secured to the opening 21g to close the receiving hole 21f upon the installation of the control circuit member 25. The cover 26 is shaped to receive the portion of the control circuit member 25 (the portion of the capacitor 34) and has an opening, which corresponds to the opening 21g. The cover 26 has an engaging recess 26a, which is engaged with the engaging claw 21h. That is, when the cover 26 is installed in the axial direction, the engaging recess 26a of the cover 26 is engaged with the engaging claw 21h, so that the cover 26 is held by the gear housing 21. Furthermore, the cover 26 has an elastic seal member 26b, which seals a space between the receiving hole 21f (the opening 21g) and the opening of the cover 26. The seal member 26b is made of butyl rubber and is arranged along the entire perimeter of the opening of the cover 26, which corresponds to the opening 21g.

In the assembled state where the motor main body 2 and the speed reducing unit 3 are assembled together, the control circuit member 25 is insertable in the gear housing 21 through the receiving hole 21f (the opening 21g). Thus, in the motor 1, various types of control circuit members 25, each of which has a different set of electrical circuit components, can be installed to the intermediate assembly (having no control circuit member 25) of the motor main body 2 and the speed reducing unit 3. More specifically, the intermediate assembly (without the control circuit member 25) of the motor main body 2 and the speed reducing unit 3 is made as a universal component, and various types of motors (each having the different set of the electrical circuit components) can be easily made through use of such a universal component by simply changing the control circuit member 25. As a result, the management of the components is eased, and the manufacturing costs can be reduced.

The motor 1 of the power window system is placed between an inner panel and an outer panel of a vehicle door, and the flat surface (the flat surfaces 4a, 21e) of the motor 1 is secured in opposed relationship to the inner panel. In this state, the external connector, which is connected to a power source (e.g., a vehicle battery), is installed to the connector arrangement 7c (the external connection terminals 13b) from a door trim side through a connector hole of the inner panel. At this time, the connector hole is sealed by the portion of the waterproof member 14, which corresponds to the connector arrangement 7c. Thus, intrusion of liquid (e.g., water) to the door trim side through a space between the inner panel and the outer panel is limited.

Next, characteristic advantages of the above embodiment will be described.

(1) The connector arrangement 7c is provided to the brush holder 7 rather than to the control circuit member. Thus, the position of the connector arrangement 7c is not limited by the securing position of the control circuit member 25. More specifically, the securing position of the control circuit member 25 is often limited because of the fact that the control circuit member 25 is installed in the gear housing 21. However, according to the present embodiment, the position of the connector arrangement 7c can be set without being limited by this fact. Thus, the connector arrangement 7c can be placed in a desired position. In this embodiment, this position is located on the lateral side of the connection between the yoke 4 and the gear housing 21 and is adjacent to the brush holder 7. As a result, it is easy to replace the normal motor (i.e., the motor without the control circuit member), which has the connector arrangement that is located on the lateral side of the connection between the yoke and the gear housing and that is adjacent to the brush holder. More specifically, the normal motor can be replaced with the motor 1 of the present embodiment by simply installing the motor 1 to the preexisting inner panel (the securing member) without a need for changing the inner panel. Furthermore, the securing position (the securing structure) of the control circuit member 25 can be set without being limited by the position of the connector arrangement 7c. Specifically, as in the present embodiment, the control circuit member 25 can be easily positioned in a dead space of the gear housing 21 between the worm receiving portion 21b and the connector arrangement 7c. As a result, for example, downsizing of the motor 1 is possible. The control circuit member 25 has the connection terminals 36a, 36b, which are electrically connected to the brushes 8 and the connector arrangement 7c (the internal connection terminals 12a, 13a) after installation of the control circuit member 25 into the gear housing 21. Thus, the brushes 8 and the connector arrangement 7c are easily connected to the electrical circuit components (e.g., the molded IC 33 and the like) of the control circuit member 25 in the installed state where the control circuit member 25 is installed into the gear housing 21.

(2) The cover 26, which is made of the resin material and closes the receiving hole 21f, includes the seal member 26b that seals between the receiving hole 21f (the opening 21g) and the opening of the cover 26. Thus, the control circuit member 25 (the electrical circuit components) is protected from the water.

(3) Similar to the internal connection terminals 12a, 13a, the connection terminals 36a, 36b are arranged parallel to one another in the direction perpendicular to the flat surface (the flat surfaces 4a, 21e) of the gear housing 21, i.e., in the direction perpendicular to the plane of FIG. 2. Thus, the connection terminals 36a, 36b do not cause an increase in a size of the motor in the direction parallel to the flat surface of the gear housing 21. Furthermore, due to the parallel arrangement of the connection terminals 36a, 36b, the connecting step, which is carried out through use of the laser welding, can be easily performed.

(4) The flat surface 33a of the molded IC 33 extends in the direction perpendicular to the flat surface (the flat surfaces 4a, 21e) of the gear housing 21, i.e., in the direction perpendicular to the plane of FIG. 2. Thus, the molded IC 33 does not cause an increase in the size of the motor in the direction parallel to the flat surface (the flat surfaces 4a, 21e) of the gear housing 21.

The opening direction of the opening 21g (i.e., the direction that is perpendicular to the linear outer edge of the opening 21g) of the receiving hole 21f is slanted, i.e., is angled relative to the axial direction of the rotatable shaft 10 and also relative to the direction perpendicular to the axial direction of the rotatable shaft 10. Similar to the internal connection terminals 12a, 13a, each of the connection terminals 36a, 36b is positioned to be visible through the opening 21g when viewed from the outside of the opening 21g in the opening direction of the opening 21g. In this way, the opening 21g is made into the simple shape having no step, and therefore it is relatively easy to visually check the operation of the laser welding of the connection terminals 36a, 36b and to visually check the connection made by the laser welding. The seal member 26b can be provided to the smooth part having not step around the opening of the cover 26, and thereby the manufacturing of the seal member 26 is eased.

The above embodiment can be modified as follows.

In the above embodiment, the molded IC 33 is secured to the base 31 through the heat sink 32 of the plate shape. Alternatively, the cover can have a heat releasing portion, which, for example, contacts the control circuit member (the molded IC 33) to release the heat at the outside of the cover. In this way, the thermal damage of the control circuit member (the electrical circuit components) can be reduced.

Figure 4:
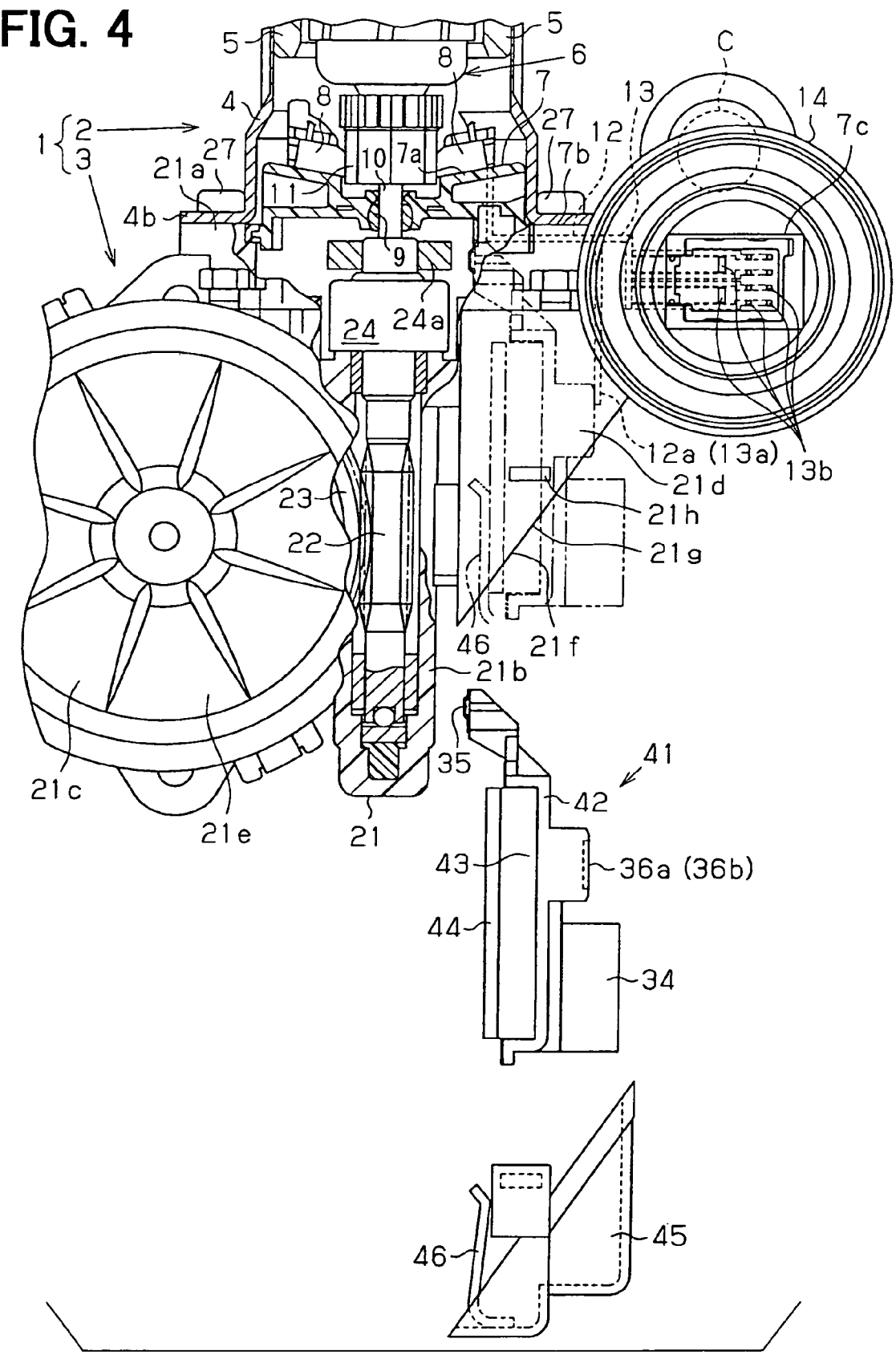
FIG. 4 is a partially fragmented and exploded view showing a first modification of the motor.
Figure 5:
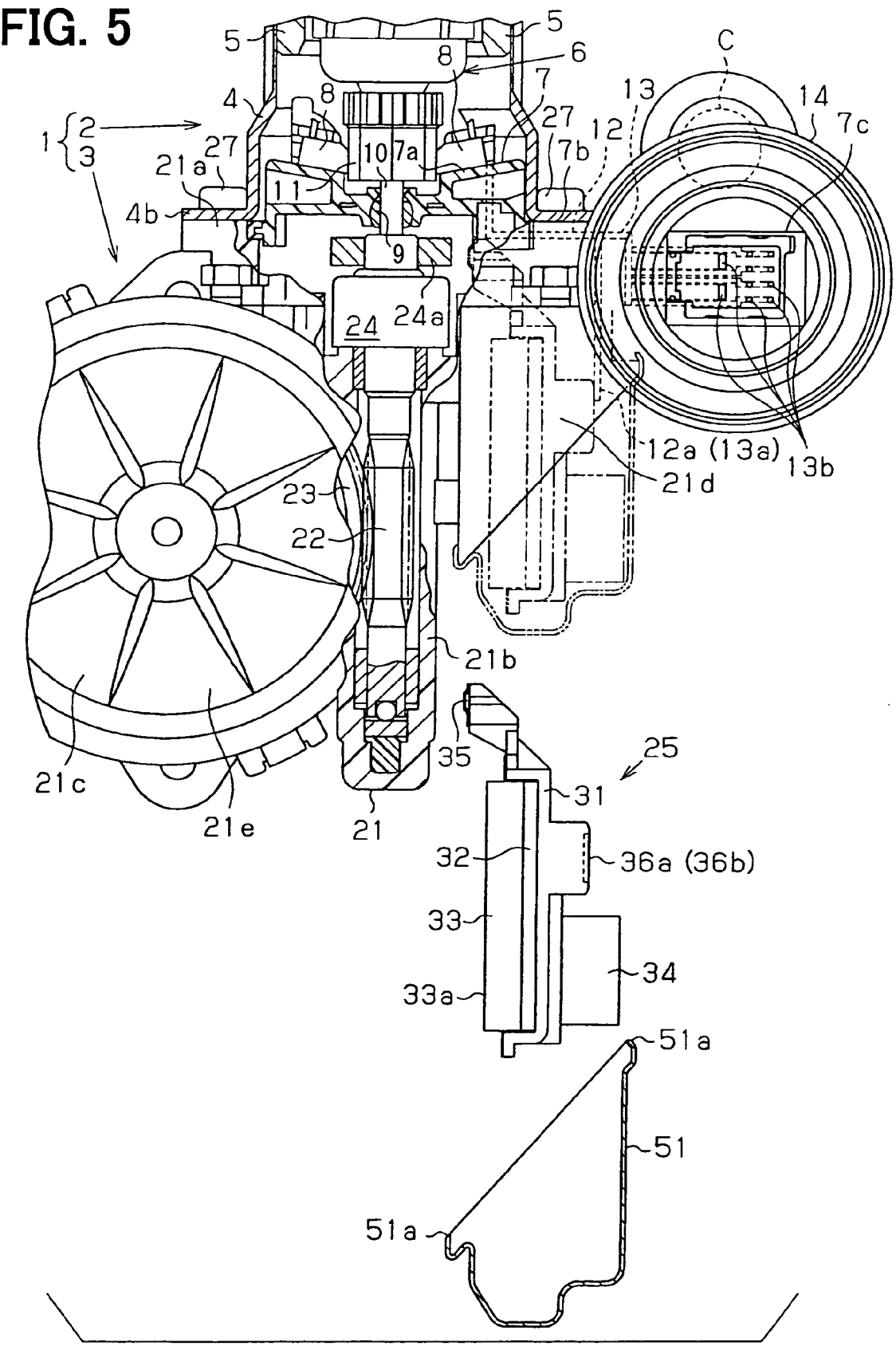
FIG. 5 is a partially fragmented and exploded view showing a second modification of the motor.

For example, the above embodiment can be modified in a manner shown in FIG. 4. In contrast to the above embodiment, in a control circuit member 41 of this example, a molded IC 43 is secured to a base 42, and a heat sink 44 is secured to the molded IC 43 by the adhesive, bond or any other joining material. Furthermore, a cover 45 is made of a metal material. The cover 45 has a resilient urging piece 46, which is made of the metal material and serves as a contacting portion and a resiliently engaging portion. The urging piece 46 is urged against the molded IC 43 of the control circuit member 41 through the heat sink 44. In FIG. 4, the urging piece 46 in a state before the urging (before the installation) is indicated by a solid line, and the urging piece 46 in the urged state is indicated by a dot-dot dash line. In this example, all of the cover 45 and the urging piece 46 cooperate together to form the heat releasing portion. In this way, the surface area of the heat releasing portion besides the heat sink 44 is increased. Thus, the thermal damage of the control circuit member 41 (the electrical circuit components) can be further reduced. Particularly, in the case where the electrical circuit components of the control circuit member 41 include the molded IC 43 that has the power MOSFET (serving as the drive circuit part), it is possible to reduce the damage of the power MOSFET, which is sensitive to the heat. Thus, the durability (reliability) of the molded IC 43 can be further improved. Furthermore, as described above, the heat releasing portion includes the urging piece 46, which has the resiliency and is urged against the molded IC 43 through the heat sink 44. Thus, the heat releasing portion can be easily and reliably engaged with the control circuit member 41 (specifically, the heat sink 44) without requiring high dimensional accuracy and high assembling accuracy (i.e., allowing occurrence of some errors in the dimensional accuracy and/or in the assembling accuracy). Furthermore, the urging piece 46 can be resiliently deformed to follow the control circuit member 41. Thus, even when the control circuit member 41 is vibrated, it is possible to limit damage to the control circuit member 41, and also it is possible to maintain the engagement (heat radiating function) of the heat releasing portion to the control circuit member 41. Since the cover 45 and the urging piece 46 are both made of the metal material, the heat radiation is effectively performed. Therefore, the above described thermal damage can be further reduced. Furthermore, it should be understood that the urging piece 46 can be eliminated. For example, as shown in FIG. 5, the cover 45 can be replaced with a cover 51 of FIG. 5. The cover 51 is made of a metal material (a steel plate, such as an SPCC steel plate) and is secured to the gear housing 21 by point crimping (a point crimping portion 51a that is crimped against the gear housing 21). The gear housing 21 shown in FIG. 5 is slightly changed from the gear housing 21 of the above embodiment (the change including, for example, elimination of the engaging claw 21h). Referring back to FIG. 4, in a case where the urging piece 46 is eliminated, the cover (the contacting portion of the cover) may be modified to directly contact the control circuit member (the molded IC). Even with this modification, rattle movement of the control circuit member can be reduced. Furthermore, the heat sink 44 may be eliminated, and the urging piece 46 may be directly urged against the molded IC 43. Furthermore, each of the cover 45 and the urging piece 46 can be made of any other appropriate material (e.g., a resin material) other than the metal material. Furthermore, the urging piece 46 can be replaced with any other suitable type of resiliently engaging portion (e.g., a wave washer or a rubber component), which is urged against the control circuit member 41 (the molded IC).

In the above embodiment, the seal member 26b, which seals the space between the receiving hole 21f (the opening 21g) and the opening of the cover 26, is provide to the cover 26 that closes the receiving hole 21f. Alternatively, the seal member may be provided to the receiving hole 21f (the opening 21g of the receiving hole 21f). Any other suitable arrangement, which is different from the seal member, may be used to limit the intrusion and application of the water to the control circuit member (the electrical circuit components).

In the above embodiment, the internal connection terminals 12a, 13a and the connection terminals 36a, 36b are arranged parallel to one another in the direction perpendicular to the flat surface (the flat surfaces 4a, 21e) of the gear housing 21, i.e., in the direction perpendicular to the plane of FIG. 2. Alternatively, the internal connection terminals 12a, 13a and the connection terminals 36a, 36b may be arranged parallel to one another in any other suitable direction.

In the above embodiment, the flat surface 33a of the molded IC 33 extends in the direction perpendicular to the flat surface (the flat surfaces 4a, 21e) of the gear housing 21, i.e., in the direction perpendicular to the plane of FIG. 2. Alternatively, the flat surface 33a of the molded IC 33 may extend in any other suitable direction.

In the above embodiment, the opening direction of the opening 21g (the direction perpendicular to the linear outer edge of the opening 21g) of the receiving hole 21f is slanted relative to the axial direction of the rotatable shaft 10 and also relative to the direction perpendicular to the axial direction of the rotatable shaft 10. However, the present invention is not limited to this. For example, the opening direction of the opening 21g (the direction perpendicular to the linear outer edge of opening 21g) of the receiving hole 21f may be changed to extend parallel to the axial direction of the rotatable shaft 10. Furthermore, the outer edge of the opening 21g is not required to extend linearly and may have a curved shape or any other appropriate shape, if desired. In the above embodiment, the control circuit member 25 is installed into the circuit receiving portion 21d in the axial direction of the rotatable shaft 10. Alternatively, the above embodiment may be modified such that the control circuit member 25 is inserted into the circuit receiving portion 21d in a direction, which is slanted, i.e., is angled relative to the axial direction of the rotatable shaft 10.

In the above embodiment, when the control circuit member 25 is installed, each of the connection terminals 36a, 36b is positioned to engage with the corresponding one of the internal connection terminals 12a, 13a (the brushes 8 and the connector arrangement 7c) to allow the electrical connection therebetween. Thereafter, the connection between each of the connection terminals 36a, 36b and the corresponding one of the internal connection terminals 12a, 13a is laser welded to form the electrical connection therebetween. Alternatively, any other suitable measures can be used to form such an electrical connection. For example, electron beam welding, TIG welding or brazing may be used to connect between each of the connection terminals 36a, 36b and the corresponding one of the internal connection terminals 12a, 13a. The shapes of the connection terminals 36a, 36b and of the internal connection terminals 12a, 13a may be changed to corresponding shapes, which allow the achievement of the electrical connection between each of the connection terminals 36a, 36b and the corresponding one of the internal connection terminals 12a, 13a only by the installation of the control circuit member 25 without a need for welding or bonding. For example, the shapes of the connection terminals 36a, 36b and of the internal connection terminals 12a, 13a may be changed to shapes that cause axial fitting or mechanical connection between each of the connection terminals 36a, 36b and the corresponding one of the internal connection terminals 12a, 13a at the time of the installation of the control circuit member 25.

In the above embodiment, the rotatable shaft 10a and the worm shaft 22 are coupled through the clutch 24 to transmit the drive force from the rotatable shaft 10a to the worm shaft 22. Alternatively, the clutch 24 may be eliminated, and the rotatable shaft 10 and the worm shaft 22 may be directly connected to each other, i.e., may be formed integrally.

In the above embodiment, the sensor magnet 24a is provided to the clutch 24. However, the present invention is not limited to this. For example, the sensor magnet may be placed on a metal plate, and the rotatable shaft may be press fitted into the metal plate.

In the above embodiment, the choke coil C is provided to the connector arrangement 7c. Alternatively, similar to the capacitor 34, the choke coil C may be provided as one of the electrical circuit components in the control circuit member. In this way, the intermediate assembly (without the control circuit member 25) of the motor main body 2 and the speed reducing unit 3 can be made as a universal component, and various types of motors (each having a different type of choke coil) can be easily made by using such a universal component. Furthermore, the above embodiment may be modified such that the capacitor 34 is provided to the connector arrangement 7c.

The base 31 of the control circuit member 25 of the above embodiment may be changed to a circuit board.

In the above embodiment, the present invention is implemented in the motor of the power window system. Alternatively, the present invention may be implemented in a motor of any other suitable device, such as a sunroof motor or a door closer motor.

In the above embodiment, the holder main body 7a, the protruding portion 7b and the connector arrangement 7c are formed integrally to form the brush holder 7. Alternatively, the holder main body 7a and the connector arrangement 7c may be formed separately. In such a case, the protruding portion 7b should be formed in one of the holder main body 7a and the connector arrangement 7c.

In the above embodiment, the gear housing 21 is made of the resin material. Alternatively, the gear housing 21 may be made of any other suitable material, such as aluminum, which shows high heat radiation characteristic. In this way, the heat radiation is effectively performed, and therefore the thermal damage, which is caused by the heat generated from the control circuit member (particularly, the molded IC), can be reduced.

Figure 6:
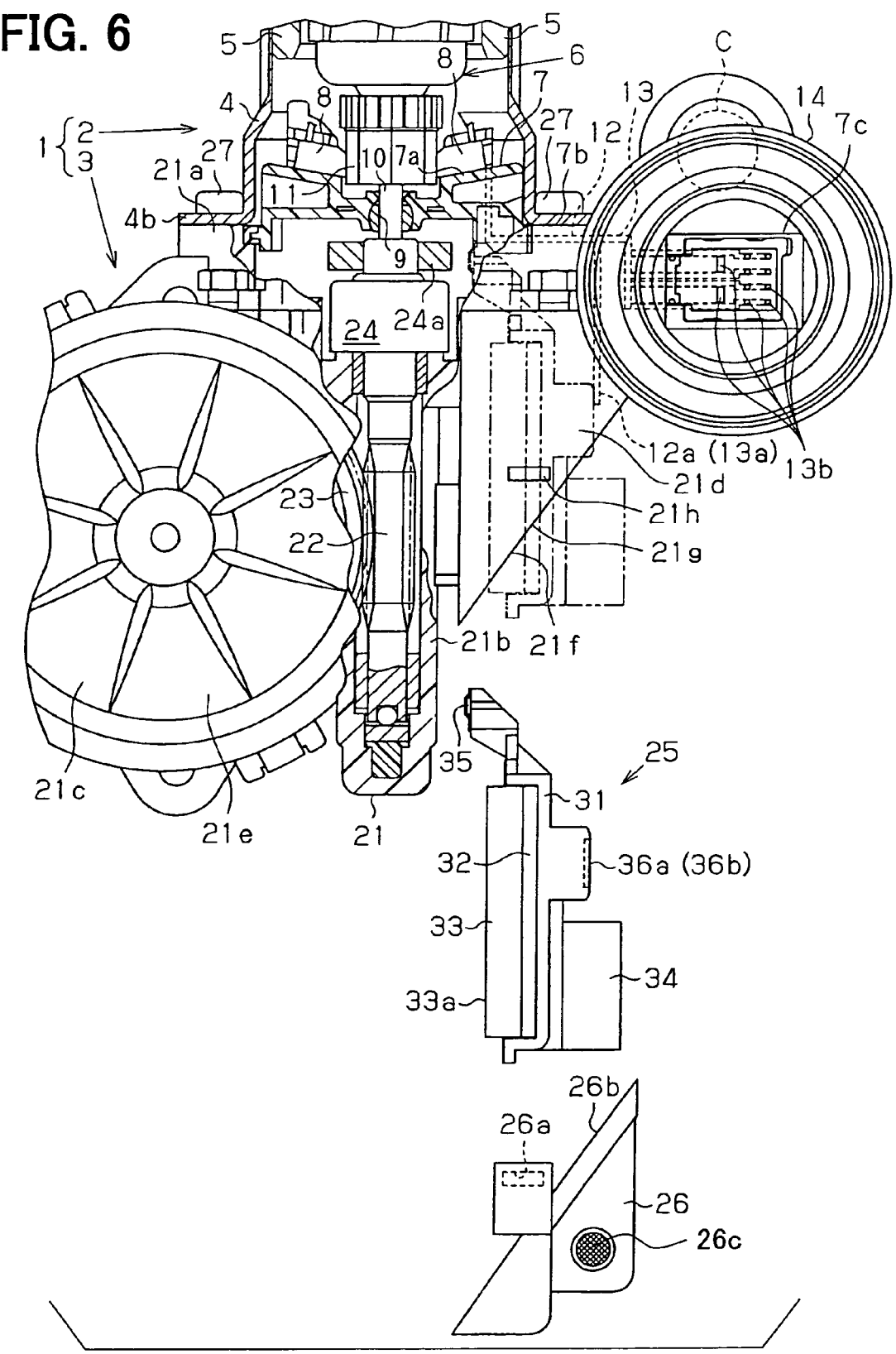
FIG. 6 is a partially fragmented and exploded view showing a third modification of the motor.

A breathing hole(s), which communicates between the interior and the exterior of the gear housing 21 (the motor), can be formed in the above-described cover 26, 45, 51. For example, as shown in FIG. 6, a breathing hole 26c may be provided to the cover 26, which is made of the resin material. The breathing hole 26c penetrates through the cover 26 in the direction perpendicular to the flat surface (the flat surfaces 4a, 21e) of the gear housing 21, i.e., in the direction perpendicular to the plane of FIG. 6 on the front side of the plane of FIG. 6 to communicate between the interior and the exterior of the gear housing 21. A breathing sheet (a mesh type sheet) is secured to a distal end of a pipe, which communicates between the interior and the exterior of the cover 26. In this way, a change in the ambient pressure of the interior of the gear housing 21, which is caused by the generation of the heat during the operation of the motor 1, is reduced. Furthermore, the hot air can be discharged through the breathing hole 26c (the breathing hole 26c thus serving as a heat releasing portion). Thus, the release of the heat is effectively performed. As a result, the thermal damage, which is caused by the heat generated from the control circuit member (particularly, the molded IC), can be further reduced. Furthermore, in the case where the opening direction of the breathing hole 26c needs to be changed to install the motor 1, for example, at a different orientation (in a different type of vehicle door) and thereby to achieve the better water proof structure, it is only required to change the cover 26 of the motor while using the rest of the motor without the cover 26 as a universal component. Thus, versatility of the gear housing 21 can be improved, and the manufacturing costs of the motor can be reduced.

Figure 7:
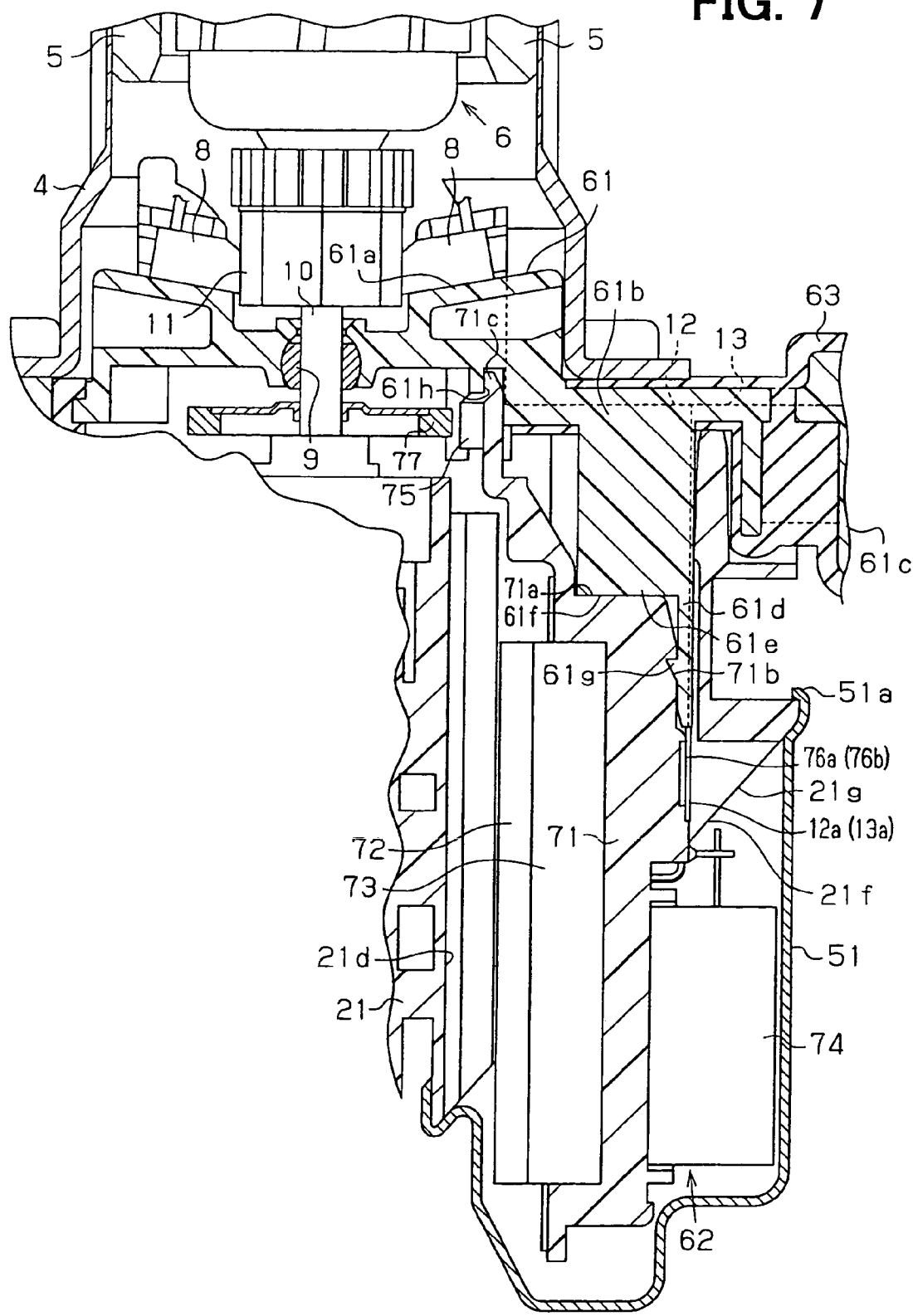
FIG. 7 is a partial cross sectional view showing a fourth modification of the motor.
Figure 8:
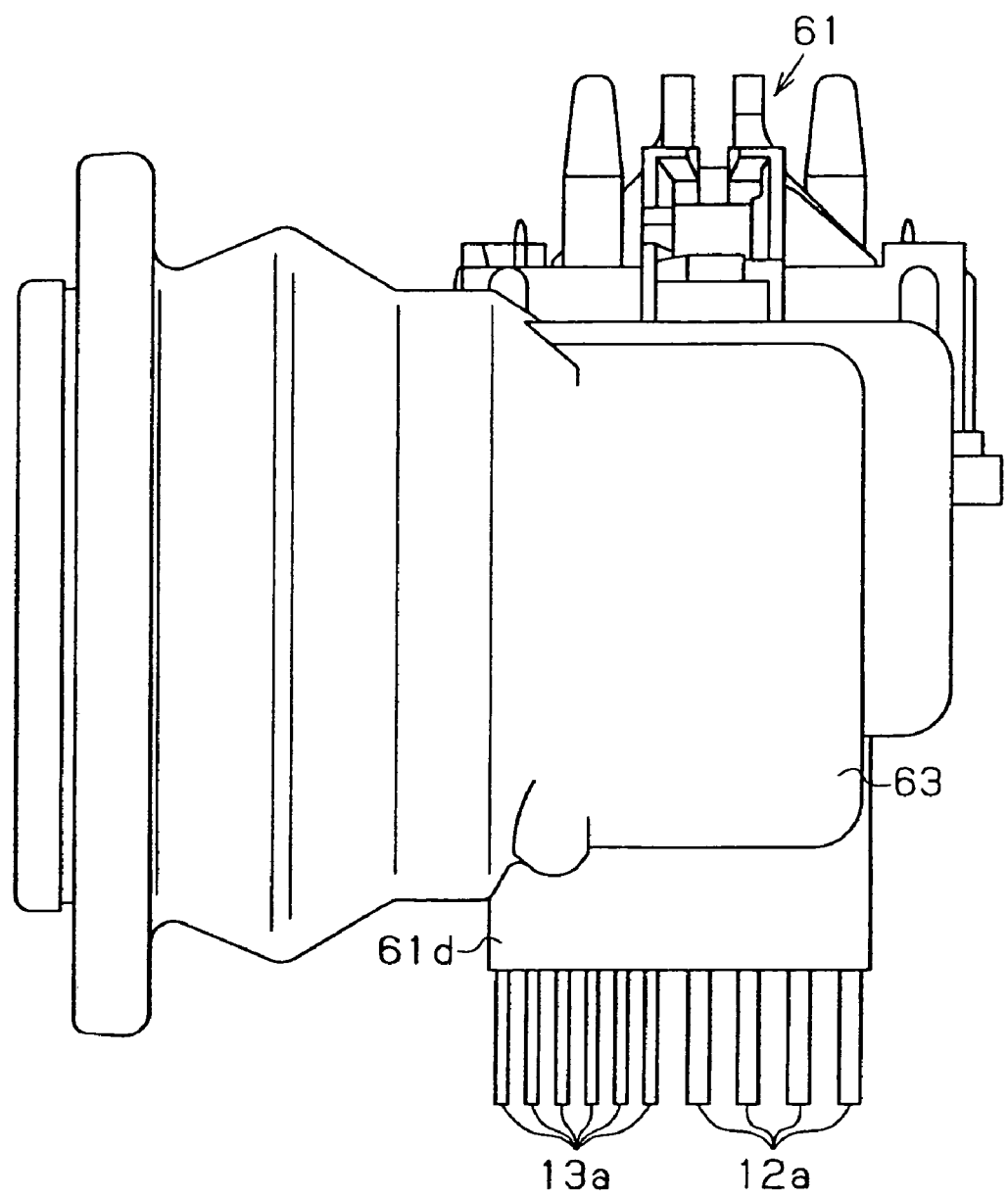
FIG. 8 is a partial view showing a brush holder of the fourth modification of the motor.

The brush holder 7 and the control circuit member 25 of the above embodiment can be replaced with a brush holder 61 and a control circuit member 62 of FIGS. 7 to 9C. Similar to the brush holder 7 of the above embodiment, the brush holder 61 of this example includes a holder main body 61a, a protruding portion 61b and a connector arrangement 61c, which are formed integrally. The protruding portion 61b of the brush holder 61 has an axially extending part 61d. The axially extending part 61d supports the base ends (up to near the welded parts) of internal connection terminals 12a, 13a of the brush side electrical conductors 12 and of the connector side electrical conductors 13. In the protruding portion 61b of the brush holder 61, a contacting projection 61e is arranged on a rotatable shaft 10 side (the left side in FIG. 7) of the axially extending part 61d to laterally extend continuously from the axially extending part 61d in the direction perpendicular to the axial direction of the rotatable shaft 10. Furthermore, the contacting projection 61e axially extends to an axial intermediate point of the axially extending part 61d. In this example, a distal end surface of the contacting projection 61e forms a brush holder side contacting portion 61f. A holding claw 61g is provided to a distal end of the axially extending part 61d to project on a rotatable shaft 10 side (the left side in FIG. 7) of the axially extending part 61d. The amount of projection of the holding claw 61g is progressively increased from the distal end of the axially extending part 61d toward the base end of the axially extending part 61d. A groove 61h is formed in the holder main body 61a of the brush holder 61 on a rotatable shaft 10 side (the left side in FIG. 7) of the contacting projection 61e. In this example, the holding claw 61g and the groove 61h form brush holder side holding portions. Similar to the brush holder 7 of the above embodiment, even in this example, a waterproof member 63, which is made of the elastomer, generally covers the outer peripheral surface of the holder main body 61a, the protruding portion 61b and the connector arrangement 61c. FIG. 8 is a side view of the brush holder 61 (including the waterproof member 63) seen from a connector arrangement 61c side (the right side in FIG. 7), showing the internal connection terminals 12a, 13a of the brush side electrical conductors 12 and of the connector side electrical conductors 13, which are arranged parallel to one another.

As shown in FIGS. 7 and 9A to 9C, the control circuit member 62 includes a base 71, a heat sink 72, a molded IC 73, a capacitor 74, a Hall element arrangement 75 and a plurality of connection terminals 76a, 76b.

A control circuit member side contacting portion 71a is formed in the base 71 to contact the brush holder side contacting portion 61f (FIG. 7) in the axial direction. A holding recess 71b is formed in the base 71 to engage with the holding claw 61g. When the holding claw 61g is fitted in the holding recess 71b, the movement of the control circuit member 62 in a direction opposite from the inserting direction of the control circuit member 62 is limited.

The Hall element arrangement 75 is provided to a distal end 71c of the base 71 of the control circuit member 62, which is a leading end of the base 71 in the inserting direction of the control circuit member 62 and which is positioned to correspond to the sensor magnet 77 that is secured to the rotatable shaft 10. As shown in FIG. 9A, the Hall element arrangement 75 includes two Hall elements 75a, 75b. The Hall elements 75a, 75b are arranged one after another in a corresponding direction, which is parallel to a plane A (FIG. 9B) of the distal end 71c of the elongated base 71 and which is perpendicular to a longitudinal direction (the top-bottom direction in FIG. 9B) of the base 71. The Hall elements 75a, 75b are provided to enable sensing of a rotational direction of the sensor magnet 77, i.e. a rotational direction of the rotatable shaft 10 based on a difference between the output of the Hall element 75a and the output of the Hall element 75b. It should be understood that the two Hall elements 75a, 75b may be replaced with two Hall ICs (not shown), respectively, or a single Hall IC having two Hall elements. Furthermore, in the above embodiment and modifications shown in FIGS. 1 to 6, the Hall element 35 is provided to the control circuit member 25, 41. However, it should be noted that the Hall element 35 may be replaced with the Hall element arrangement 75, which includes the two Hall elements (or alternatively the Hall ICs) 75a, 75b shown in FIGS. 7 to 9C. Thus, in the present invention, at least one Hall element should be provided, and it is more desirable to provide two or more Hall elements to allow the sensing of the rotational direction of the rotatable shaft 10. In the modification shown in FIGS. 7 to 9C, the Hall element arrangement 75 is displaced away from the rest of the electrical circuit components (e.g., the molded IC 73 and the capacitor 74) in a direction perpendicular to a plane B (FIG. 9B) of the base 71, more specifically the plane B of a main body 71d of the base 71, which is generally planar and from which the distal end 71c of the base 71 projects. Also, the Hall element arrangement 75 is displaced away from the rest of the electrical circuit components (e.g., the molded IC 73 and the capacitor 74) in the longitudinal-direction (the top-bottom direction in FIG. 9B) of the base 71. A tip of the distal end 71c of the base 71 except the Hall element arrangement 75 is configured to be fitted into the groove 61h (FIG. 7). In this example, the holding recess 71b and the distal end 71c form control circuit member side holding portions.

The control circuit member 62 of this example is installed into the gear housing 21 (the circuit receiving portion 21d) through the receiving hole 21f in the control circuit member installation step. More specifically, the control circuit member side contacting portion 71a of the control circuit member 62 axially contacts the brush holder side contacting portion 61f. At this time, the holding claw 61g is engaged with the holding recess 71b, and the distal end 71c of the control circuit member 62 is fitted into the groove 61h. Thus, the control circuit member 62 is held by the brush holder 61 and therefore by the gear housing 21. Through this installation, each of the connection terminals 76a, 76b is engaged with the corresponding one of the internal connection terminals 12a, 13a to allow achievement of electrical connection therebetween. In the connecting step, each of the connection terminals 76a, 76b, which are visible through the opening 21g when viewed from the outside of the opening 21g in the opening direction, is laser welded to the corresponding one of the internal terminals 12a, 13a (FIG. 8) to form the electrical connection therebetween. In this example, the cover 51, which is similar to that of FIG. 5, is used.

Upon the installation, the brush holder side contacting portion 61f and the control circuit member side contacting portion 71a are engaged with one another in the axial direction. Thus, the positioning of the control circuit member 62 relative to the brush holder 61 in the engaging direction (the axial direction) can be easily performed. Furthermore, as described above, the brush holder side contacting portion 61f and the control circuit member side contacting portion 71 are engaged with each other. Thus, for example, after the manufacturing, even when the external force (shock) is applied to urge the control circuit member 62 toward the brush holder 61, i.e., toward the top end of FIG. 7, application of stress to the connection terminals 76a, 76b, which are connected to the internal connection terminals 12a, 13a, is limited. As a result, the appropriate connection between each of the internal connection terminals 12a, 13a and the corresponding one of the connection terminals 76a, 76b is maintained.

Furthermore, as described above, the distal end 71c is fitted into the groove 61h of the brush holder 61. Thus, accuracy in the positioning of the Hall element arrangement 75, which is provided to the distal end 71c, is increased. This results in relatively high accuracy in the relative position between the sensor magnet 77 and the Hall element arrangement 75 and thereby results in relatively high accuracy in the measurement of the rotational speed.

Furthermore, as described above, the distal end 71c is fitted into the groove 61h, and the holding claw 61g is engaged with the holding recess 71b. Thus, the control circuit member 62 is held by the brush holder 61, i.e., is held relative to the gear housing 21. Therefore, handling of control circuit member 62 is eased. For example, it is possible to easily limit displacement of the connection point between each of the internal connection terminals 12a, 13a and the corresponding one of the connection terminals 76a, 76b at the time of, for example, welding the connection point. More specifically, it is possible to eliminate or simplify a device, which maintains the relative position between the control circuit member 62 and the brush holder 61 (the gear housing 21) until the time of connecting the connecting point, for example, by the welding. Furthermore, as described above, the control circuit member 62 is held by the brush holder 61. Thus, for example, after the manufacturing, even when the external force (the shock) is applied to the control circuit member 62, it is possible to prevent or reduce application of the stress to the connection terminals 76a, 76b, which are connected to the internal connection terminals 12a, 13a. As a result, the appropriate connection between each of the internal connection terminals 12a, 13a and the corresponding one of the connection terminals 76a, 76b is maintained.

Furthermore, in this example (FIGS. 7 to 9C), the holding claw 61g and the groove 61h form the brush holder side holding portions, and the holding recess 71b and the distal end 71c form the control circuit member side holding portions. Through use of these brush holder side holding portions and the control circuit member side holding portions, the control circuit member 62 is held by the brush holder 61. However, the present invention is not limited to the above structures, and any other structures can be used to form the brush holder side holding portion and the control circuit member side holding portion to hold the control circuit member 62 relative to the brush holder 61. For example, the groove 61h (i.e., the structure, in which the distal end 71c is fitted into the groove 61h) may be eliminated, and other two holding claws and corresponding two holding recesses may be provided to hold the control circuit member 62 relative to the brush holder 61.

Furthermore, in the above example (FIGS. 7 to 9C), the control circuit member 62 is held by the brush holder 61 to hold the control circuit member 62 relative to the gear housing 21. Alternatively, the control circuit member 62 may be directly held by the gear housing 21 by, for example, a corresponding structure (e.g., a holding claw provided in the gear housing).

Furthermore, in the above example (FIGS. 7 to 9C), the control circuit member 62 (the control circuit member side contacting portion 71a) contacts the brush holder 61 (the brush holder side contacting portion 61f) in the axial direction. Alternatively, the control circuit member 62 (the control circuit member side contacting portion 71a) may contact the brush holder 61 (the brush holder side contacting portion 61f) in any other direction other than the axial direction. For example, in a case where the control circuit member is installed into the circuit receiving portion in the direction, which is slanted, i.e., is angled relative to the axial direction of the rotatable shaft, the control circuit member may contacts the brush holder in the installation direction of the control circuit member.

The Hall element 35, which is held by the control circuit member 25 of the above embodiment, may be alternatively provided to the holder main body 7a of the brush holder 7. In such a case, the terminals of the electrical conductors of the Hall element may be arranged parallel to one another in a manner similar to that of the internal connection terminals 12a, 13a, and connection terminals, which correspond to the terminals of the electrical conductors of the Hall element, may be arranged parallel to one another in a manner similar to that of the connection terminals 36a, 36b.

In the above embodiment, the sensor magnet 24a is provided to the clutch 24. However, the present invention is not limited to this. For example, the sensor magnet may be provided to the distal end (the lower end in FIG. 2) of the worm shaft 22, and the Hall element may be provided to the position (the lower position in FIG. 2), which is opposed to the sensor magnet.

Figure 9C:
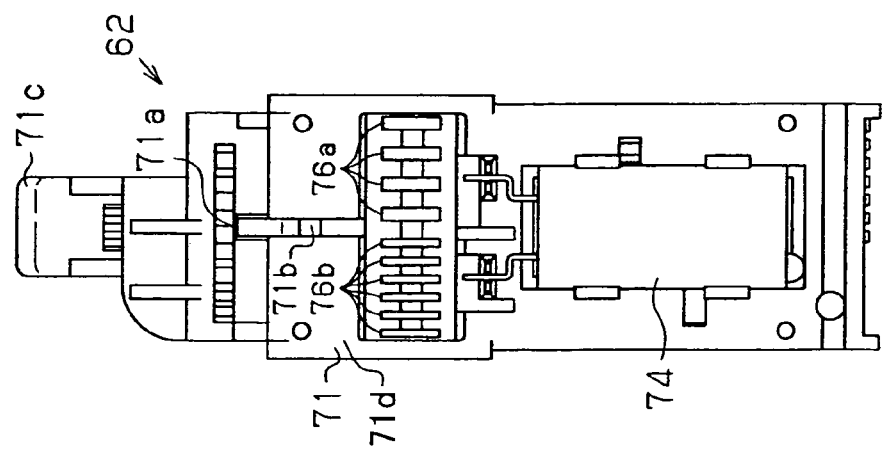
FIG. 9C is a plan view of the control circuit member of FIGS. 9A and 9B seen from the other side of the control circuit member.
Figure 9B:
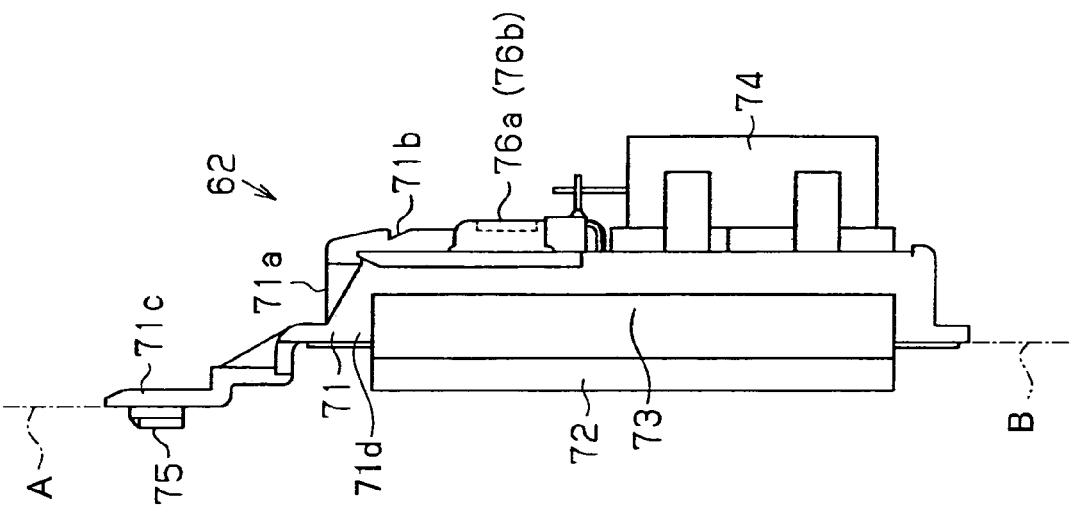
FIG. 9B is a side view of the control circuit member of FIG. 9A.
Figure 9A:
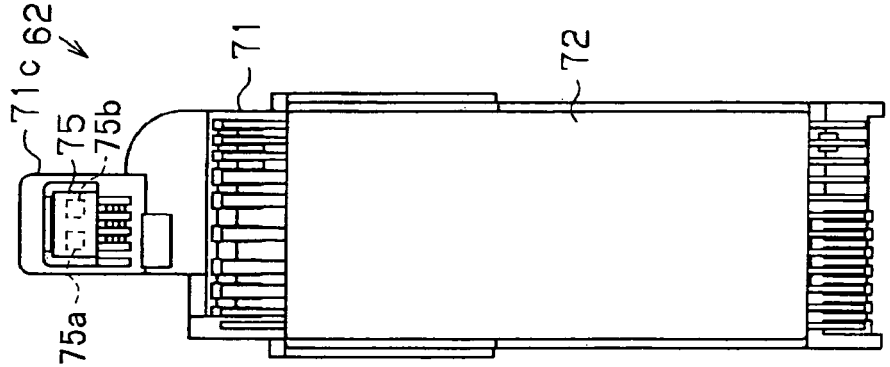
FIG. 9A is a plan view of a control circuit member of the fourth modification of the motor seen from one side of the control circuit member.
Figure 10:
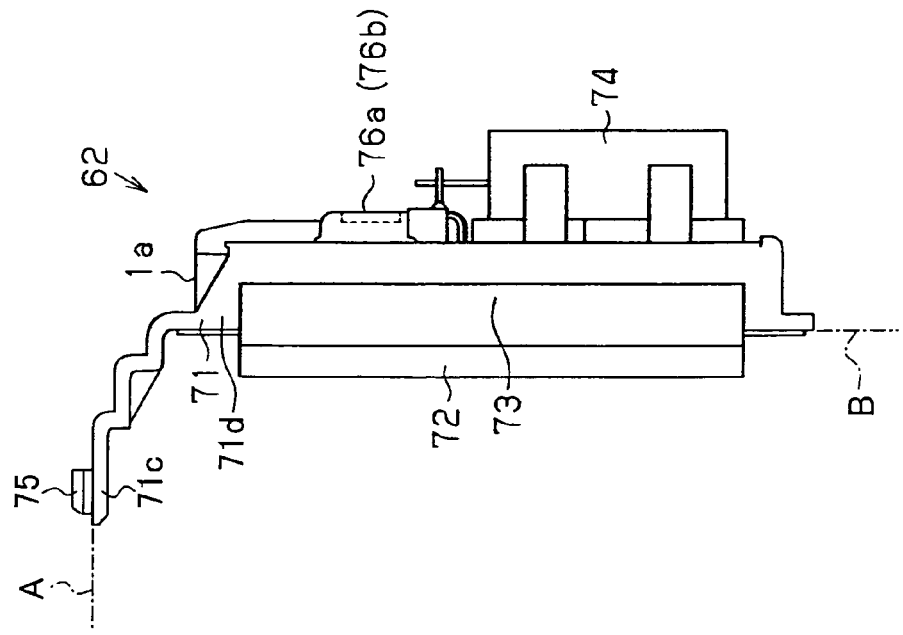
FIG. 10 is a side view showing a modification of the control circuit member shown in FIGS. 9A to 9C.
Figure 11:
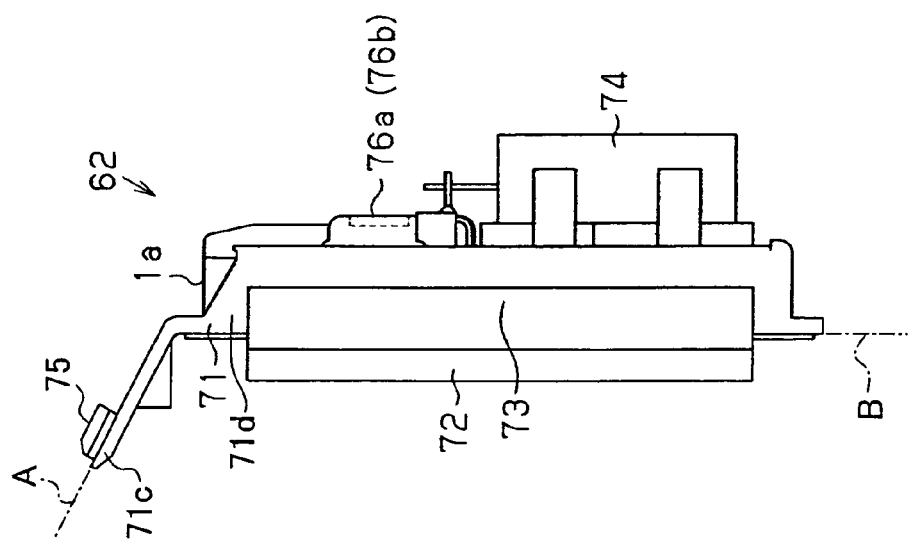
FIG. 11 is a side view showing another modification of the control circuit member shown in FIGS. 9A to 9C.

In the modification shown in FIGS. 7 to 9C, the plane A of the projected distal end 71c of the base 71, which is projected from the main body 71d of the base 71 and holds the Hall element arrangement 75, is parallel to the plane B of the main body 71d of the base 71 (FIG. 9B). Alternatively, as shown in FIGS. 10 and 11, depending on the location, orientation and/or configuration of the sensor magnet 77, the Hall element arrangement 75 may be oriented in any other appropriate direction and may be positioned in any other appropriate location. Specifically, as shown in FIG. 10, the plane A of the projected distal end 71c of the base 71, which is projected from the main body 71d of the base 71 and holds the Hall element arrangement 75, may be oblique to the plane B of the main body 71d of the base 71. Furthermore, as shown in FIG. 11, the plane A of the distal end 71c of the base 71 may be perpendicular to the plane B of the main body 71d of the base 71. Furthermore, in the cases of FIGS. 10 and 11, the configuration of the opening 21g of the gear housing 21 and the installing direction of the control circuit member 62 into the gear housing 21 may be changed in an appropriate manner to allow installation of the projected distal end 71c of the base 71, which holds the Hall element arrangement 75, to a point that is adjacent to the sensor magnet 77. Also, the structure of the control circuit member 62 and the structure of the brush holder 61 may be changed to allow such a change. Specifically, the holding claw 61g may be eliminated from the brush holder 61, and the holding recess 71b may be eliminated from the base 71 in the cases of FIGS. 10 and 11 to allow the installation of the control circuit member 62 in, for example, the oblique installing direction, which is oblique to the axial direction of the rotatable shaft 10. In such a case, the control circuit member 62 may be press fitted into the gear housing 21 or may be held in the gear housing 21 by any other appropriate way.

Additional advantages and modifications will readily occur to those skilled in the art. The invention in its broader terms is therefore not limited to the specific details, representative apparatus, and illustrative examples shown and described.

What is claimed is:

1. A motor comprising:
a motor main body that includes a brush holder, wherein the brush holder has a connector arrangement that is directly connectable with an external connector to receive electric power, and the brush holder holds a plurality of power supply brushes; and
a speed reducing unit that includes:
a gear housing that is connected to the motor main body and includes a circuit member installation opening, wherein the installation opening opens in a direction away from the brush holder,
a speed reducing mechanism that is received in the gear housing and decelerates rotation of the motor main body, wherein the speed reducing mechanism includes a worm shaft, which is driven by the motor main body, and a worm wheel, which is meshed with the worm shaft; and
a control circuit member that is installed in the gear housing through the installation opening of the gear housing, wherein
the control circuit member controls the rotation of the motor main body and is electrically connected to the connector arrangement and the power supply brushes,
the control circuit member includes a plurality of connection terminals, each of which is electrically connected to a corresponding one of the connector arrangement and the power supply brushes; and
the connection terminals of the control circuit member extend generally parallel to a rotational axis of the motor main body and are arranged generally parallel to one another in a direction that is perpendicular to a plane of the worm wheel.

2. The motor according to claim 1, wherein the control circuit member is positioned on one lateral side of the worm shaft that is opposite from the worm wheel.

3. The motor according to claim 1, wherein the connection terminals of the control circuit member are positioned in the gear housing in such a manner that the connection terminals are visible from outside of the gear housing through the installation opening along a direction that is perpendicular to a linear outer edge of the installation opening.

4. The motor according to claim 3, wherein the direction, which is perpendicular to the linear outer edge of the installation opening, is angled relative to an axial direction of the motor main body and is also angled relative to a direction perpendicular to the axial direction of the motor main body.

5. The motor according to claim 1, wherein: the brush holder includes at least one brush holder side contacting portion; and the control circuit member includes at least one control circuit member side contacting portion, each of which contacts a corresponding one of the at least one brush holder side contacting portion.

6. The motor according to claim 1, wherein: the brush holder includes at least one brush holder side holding portion; and the control circuit member includes at least one control circuit member side holding portion, each of which is engaged with a corresponding one of the at least one brush holder side holding portion to hold the control circuit member relative to the brush holder.

7. The motor according to claim 1, wherein the control circuit member includes a rotation sensor that senses the rotation of the motor main body.

8. The motor according to claim 7, wherein the rotation sensor is a Hall element.

9. The motor according to claim 1, further comprising a cover that covers the installation opening of the gear housing.

10. The motor according to claim 9, further comprising an elastic seal member that seals between the installation opening of the gear housing and the cover.

11. The motor according to claim 9, wherein the cover includes a heat releasing portion, through which heat generated from the control circuit member is released outwardly.

12. The motor according to claim 11, wherein the cover is made of a metal material.

13. The motor according to claim 9, wherein the cover has a contacting portion that contacts the control circuit member.

14. The motor according to claim 13, wherein the contacting portion of the cover is resiliently urged against the control circuit member.

15. The motor according to claim 9 wherein the cover includes a breathing hole that communicates between an interior and an exterior of the gear housing.

16. The motor according to claim 9, wherein: a portion of the control circuit member projects outwardly from the gear housing through the installation opening of the gear housing; and the cover receives the portion of the control circuit member, which is projected outwardly from the installation opening.

17. The motor according to claim 1, wherein the control circuit member includes:
an elongated base; and
a plurality of electrical circuit components, which are secured to the base and control the rotation of the motor main body; and a plane of the base is perpendicular to a plane of the worm wheel.

18. The motor according to claim 1, wherein:
the control circuit member includes:
an elongated base; and
a plurality of electrical circuit components, which are secured to the base and control rotation of the motor main body; the plurality of connection terminals is secured to the base;
at least one of the plurality of connection terminals is electrically connected to the connector arrangement;
at least another one of the plurality of connection terminals is electrically connected to at least one of the plurality of power supply brushes;
the plurality of electrical circuit components includes a rotation sensor that senses the rotation of the motor main body; and
the rotation sensor is displaced away from the rest of the plurality of electrical circuit components in a direction perpendicular to a plane of the base.

19. A motor comprising:
a motor main body that includes a brush holder, wherein the brush holder has a connector arrangement that is directly connectable with an external connector to receive electric power, and the brush holder holds a plurality of power supply brushes; and
a speed reducing unit that includes:
a gear housing that is connected to the motor main body and includes a circuit member installation opening, wherein the installation opening opens in a direction away from the brush holder;

a speed reducing mechanism that is received in the gear housing and decelerates rotation of the motor main body, and a control circuit member that is installed in the gear housing through the installation opening of the gear housing, wherein the control circuit member controls the rotation of the motor main body and is electrically connected to the connector arrangement and the power supply brushes, the speed reducing mechanism includes a worm shaft that is driven by the motor main body and a worm wheel that is meshed with the worm shaft; and the control circuit member includes:
　a molded IC, which controls the rotation of the motor main body;
wherein a plane of the molded IC is perpendicular to a plane of the worm wheel;
　a plurality of connection terminals that are electrically connected to the molded IC; and
　a base, to which the molded IC and the plurality of connection terminals are secured.

\* \* \* \* \*